W. S. ROBERTS.
Nut-Locks.

No. 157,636. Patented Dec. 8, 1874.

Witnesses:
James E. Arnold
Benjamin Arnold

Inventor
William S. Roberts

UNITED STATES PATENT OFFICE.

WILLIAM S. ROBERTS, OF EAST GREENWICH, RHODE ISLAND.

IMPROVEMENT IN NUT-LOCKS.

Specification forming part of Letters Patent No. 157,636, dated December 8, 1874; application filed July 19, 1873.

*To all whom it may concern:*

Be it known that I, WILLIAM S. ROBERTS, of East Greenwich, in the county of Kent and State of Rhode Island, have invented certain Improvements in Lock-Nuts, of which the following is a specification:

This invention relates to the securing or locking of nuts on screw-bolts, so that they will not work loose and jar off. It consists in making two or more grooves in the sides of the threaded part of the bolt; also, corresponding ones through the nut, the ends of the grooves in the nut being recessed or carried out toward the sides of the nut on that face which goes toward the head of the bolt.

Figure 1:
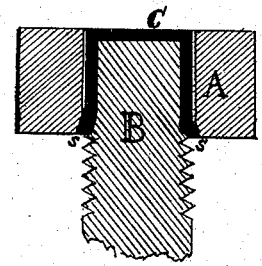
Figure 2:
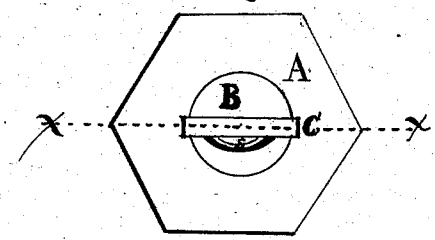
Figure 3:

Figure 1 shows a section of the nut, bolt, and staple, taken through in the direction of the line $x$ $x$, Fig. 2. Fig. 2 is a top or end view of the bolt, &c. Fig. 3 shows the spring-staple.

A is the nut, B is the bolt, and C is the spring-staple, all the parts being shown in their places in Fig. 1. The grooves through the nut are spread out at $s$ $s$ on the under side of the nut toward the sides, so as to form recesses to receive the ends of the staple, which are bent outward. The grooves in the bolt are continued across the end of the bolt, so as to let the cross-bar of the staple go in flush, or nearly so, with the end of the bolt, one side of this groove in the end of the bolt being cut away at $a$ to form a recess into which the end of a screw-driver or other like utensil may be inserted to pry the staple out.

The spring-staple C may be made of either round or square metal, of such size as to enter the grooves easily and be readily driven into place. The ends of the staple are bent outward, so as to spring into the recesses at $s$ $s$. The nut is screwed on the bolt, the slots in the bolt and nut made to agree; then the staple is sprung together, so as to enter the slots, and driven in with a few light blows. The legs of the staple will prevent the nut from turning.

Having thus described the improved lock-nut, what I claim as my invention, and desire to secure by Letters Patent, is—

The spring-staple C, with its ends bent substantially as described, in combination with the bolt B and nut A, grooved and recessed as herein set forth, for the purpose specified.

WILLIAM S. ROBERTS.

Witnesses:
JAMES E. ARNOLD,
BENJAMIN ARNOLD.